US009152333B1

(12) United States Patent
Johnston et al.

(10) Patent No.: US 9,152,333 B1
(45) Date of Patent: Oct. 6, 2015

(54) SYSTEM AND METHOD FOR ESTIMATING STORAGE SAVINGS FROM DEDUPLICATION

(71) Applicant: NetApp, Inc., Sunnyvale, CA (US)

(72) Inventors: Craig Anthony Johnston, Livermore, CA (US); Vinod Daga, Santa Clara, CA (US); Subramaniam Periyagaram, Campbell, CA (US); Alexander James Gronbach, San Luis Obispo, CA (US); Bharadwaj Vellore Ramesh, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 98 days.

(21) Appl. No.: 13/768,191

(22) Filed: Feb. 15, 2013

(51) Int. Cl.
    G06F 12/00 (2006.01)
    G06F 3/06 (2006.01)
(52) U.S. Cl.
    CPC ............ G06F 3/0641 (2013.01); G06F 3/0608 (2013.01); G06F 3/0673 (2013.01)
(58) Field of Classification Search
    None
    See application file for complete search history.

(56) References Cited

U.S. PATENT DOCUMENTS

| 8,645,334 | B2* | 2/2014 | Leppard | 707/692 |
| 8,793,226 | B1* | 7/2014 | Yadav et al. | 707/692 |
| 2013/0198148 | A1* | 8/2013 | Chambliss et al. | 707/692 |
| 2013/0198471 | A1* | 8/2013 | Tsuchiya et al. | 711/162 |
| 2014/0052699 | A1* | 2/2014 | Harnik et al. | 707/692 |

OTHER PUBLICATIONS

Harnik, et al, Estimating Deduplication Ratios in Large Data Sets, IBM research labs, Presented Apr. 20, 2012 at the IEEE conference on massive data storage.*

Constantine, et al, Quick estimation of Data Compression and De-duplication for large storage system, 2011, First International Conference on Data Compression, Communications and Processing.*

* cited by examiner

Primary Examiner — Aimee Li
Assistant Examiner — Jason Blust
(74) Attorney, Agent, or Firm — Cooper Legal Group, LLC (57) ABSTRACT

Techniques for a method of estimating deduplication potential are disclosed herein. The method includes steps of selecting randomly a plurality of data blocks from a data set as a sample of the data set, collecting fingerprints of the plurality of data blocks of the sample, identifying duplicates of fingerprints of the sample from the fingerprints of the plurality of data blocks, estimating a total number of unique fingerprints of the data set depending on a total number of the duplicates of fingerprints of the sample based on a probability of fingerprints from the data set colliding in the sample, and determining a total number of duplicates of fingerprints of the data set depending on the total number of the unique fingerprints of the data set.

20 Claims, 7 Drawing Sheets

SYSTEM AND METHOD FOR ESTIMATING STORAGE SAVINGS FROM DEDUPLICATION

FIELD OF THE INVENTION

At least one embodiment of the present invention pertains to network storage systems, and more particularly, to a network storage system providing a mechanism to estimate potential storage savings from deploying data deduplication.

BACKGROUND

A storage system comprises one or more storage devices to store information. A storage system can include a storage operating system which organizes the stored information and performs operations such as reads and writes on the storage devices. Network based storage, or simply "network storage", is a common type of storage system for backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

Archival data storage is a central part of many industries, e.g., banks, government facilities/contractors, securities brokerages, etc. In many of these environments, it is necessary to store selected data, e.g., electronic-mail messages, financial documents or transaction records, in an read-only manner, possibly for long periods of time. Typically, data backup operations are performed to ensure the protection and restoration of such data in the event of a failure. However, backup operations often result in the duplication of data on backup storage resources, such as disks and/or tape, causing inefficient consumption of the storage space on the resources.

Furthermore, in a large-scale storage system, such as an enterprise storage network, it is common for certain data to be stored in multiple places in the storage system. Sometimes this duplication is intentional, but often it is an incidental result of normal operation of the storage system. Therefore, it is common that a given sequence of data will be part of two or more different files. "Data duplication", as the term is used herein, generally refers to unintentional duplication of data in a given storage device or system. Data duplication generally is not desirable, because storage of the same data in multiple places consumes extra storage space, which is a valuable and limited resource.

Consequently, storage servers in many large-scale storage systems have the ability to "deduplicate" data. Data deduplication is a technique to improve data storage utilization by reducing data duplication. A data deduplication process identifies duplicate data in a data set and replaces the duplicate data with references that point to data stored elsewhere in the data set. A data set can be a data volume, data object, data section, data table, data storage, or other type of data collection.

The effectiveness of a deduplication process is dependent on both the algorithm of the deduplication process and on the data in the data set. One way to know how effective a deduplication process will be on a data set is to actually collect and analyze the blocks of the data set. A "block" in this context is the smallest unit of user data that is read or written by a given file system. For example, a common block size in today's storage systems is 4 Kbytes. If the data set is large, the deduplication process can take a long time (e.g., many hours). For instance, a deduplication program can run at a data storage server. The deduplication program scans blocks of an entire volume (i.e., data set) of the data storage server, sorts the blocks, and reports on the deduplication effectiveness based on the number of duplicates of blocks found. This process can take many hours to scan the entire volume before the effectiveness information becomes available to decide whether to enable deduplication on that volume.

Another way to predict the effectiveness of the deduplication process is to run the deduplication process on other, smaller data sets that have similar data patterns as the target data set. However, the effectiveness of this approach varies and heavily depends on how similar the data patterns are between the smaller data sets and the target data set.

SUMMARY

Techniques introduced here provide a fast and efficient process of estimating storage savings (also referred to as deduplication potential) that can result from deduplicating a data set. In particular, the technology introduced here includes a data storage server and a method that enable a fast estimation of the storage savings of the data set by scanning a sampling portion of the data set. The method proficiently estimates the number of duplicates for the entire data set from the duplication information of the sampling portion, based on a probability of fingerprints (e.g., hash values) from the data set colliding in the sampling portion. The term "colliding" refers to a situation of two blocks having the same fingerprint.

In accordance with the techniques introduced here, therefore, a method and apparatus for estimating deduplication potential is provided. The method includes steps of selecting randomly a plurality of data blocks from a data set as a sample of the data set, collecting fingerprints of the plurality of data blocks of the sample, identifying duplicates of fingerprints of the sample from the fingerprints of the plurality of data blocks, estimating a total number of unique fingerprints of the data set depending on a total number of the duplicates of fingerprints of the sample based on a probability of fingerprints from the data set colliding in the sample, and determining a total number of duplicates of fingerprints of the data set depending on the total number of the unique fingerprints of the data set.

The techniques introduced here are capable of a fast estimating of the storage savings, because only a sampling portion of the data set, instead of the entire data set, needs to be scanned. The duplication information of the data set is truthfully predicted based on the duplication information of the sampling portion.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
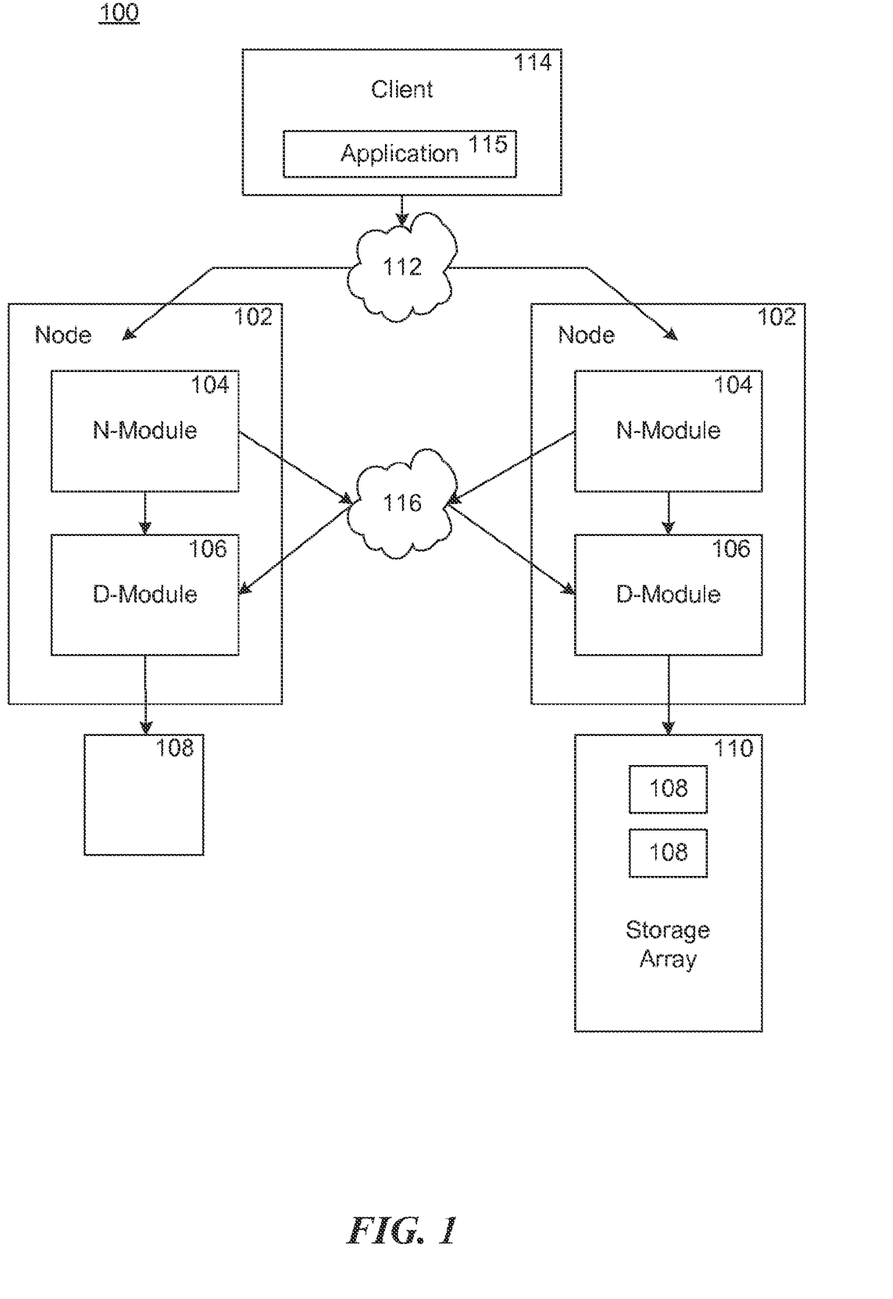
FIG. 1 is a schematic block diagram showing a plurality of storage system nodes interconnected as a storage cluster for servicing data requests.

FIG. 1 is a schematic block diagram showing an example of a system in which the techniques introduced here can be implemented. The system includes multiple storage system nodes 102 interconnected as a storage cluster 100. Note, however, that the techniques introduced here are not limited to being implemented in the architecture shown, but can be implemented advantageously in any of various storage system architectures. For example, the techniques could instead be implemented in a single monolithic storage server.

The storage system nodes 102 are configured to provide storage services for one or more clients 114 in relation to data organized at storage devices managed by the nodes 102. At least one client computing system (or "client") 114 interfaces with one or more of the nodes 102 for reading or writing data stored at the storage devices.

Nodes 102 can include various components that cooperate to provide distributed storage system architecture of cluster 100. In one embodiment, each node 102 includes a network element (N-module 104) and a storage device element (D-module 106). Each N-module 104 includes functionality that enables node 102 to connect to client computing systems 114 over a network connection 112, while each D-module 106 connects to one or more storage devices, such as a storage device 108 or a storage array 110. Illustratively, network 112 can be embodied as an Ethernet network, a Fibre Channel (FC) network or any other network type. Nodes 102 can be interconnected by a cluster switching fabric 116 which may be embodied as a Gigabit Ethernet switch, for example.

FIG. 1 shows an equal number of N-modules and D-modules in the cluster 100; however, a cluster can include different numbers of N-modules and D-modules. For example, there may be numbers of N-modules and D-modules interconnected in a cluster that do not reflect a one-to-one correspondence between the N-modules and D-modules.

Each client 114 can be, for example, a general purpose computer having components that may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 114 can be configured to interact with a node 102 in accordance with a client/server model of information delivery. For example, each client 114 can request the services of a node 102 (e.g., read or write services), and the node 102 can return the results of the services requested by the client 114 over network 112.

Clients 114 can be configured to execute software and/or firmware instructions (hereinafter collectively called "software"), shown as application 115 for reading and writing data stored in storage devices 108. Application 115 can be, for example, a database application, a financial management system, an electronic mail application or any other application type.

Client 114 can issue packets using application 115 according to file-based access protocols, such as the Common Internet File System ("CIFS") protocol or the Network File System ("NFS") protocol, over the Transmission Control Protocol/Internet Protocol ("TCP/IP") when accessing data in the form of certain data containers, such as files. Alternatively, the client 114 can issue packets using application 115 including block-based access protocols, such as the Small Computer Systems Interface ("SCSI") protocol encapsulated over TCP ("iSCSI") and SCSI encapsulated over Fibre Channel ("FCP"), when accessing data in the form of other data containers, such as blocks.

Figure 2:
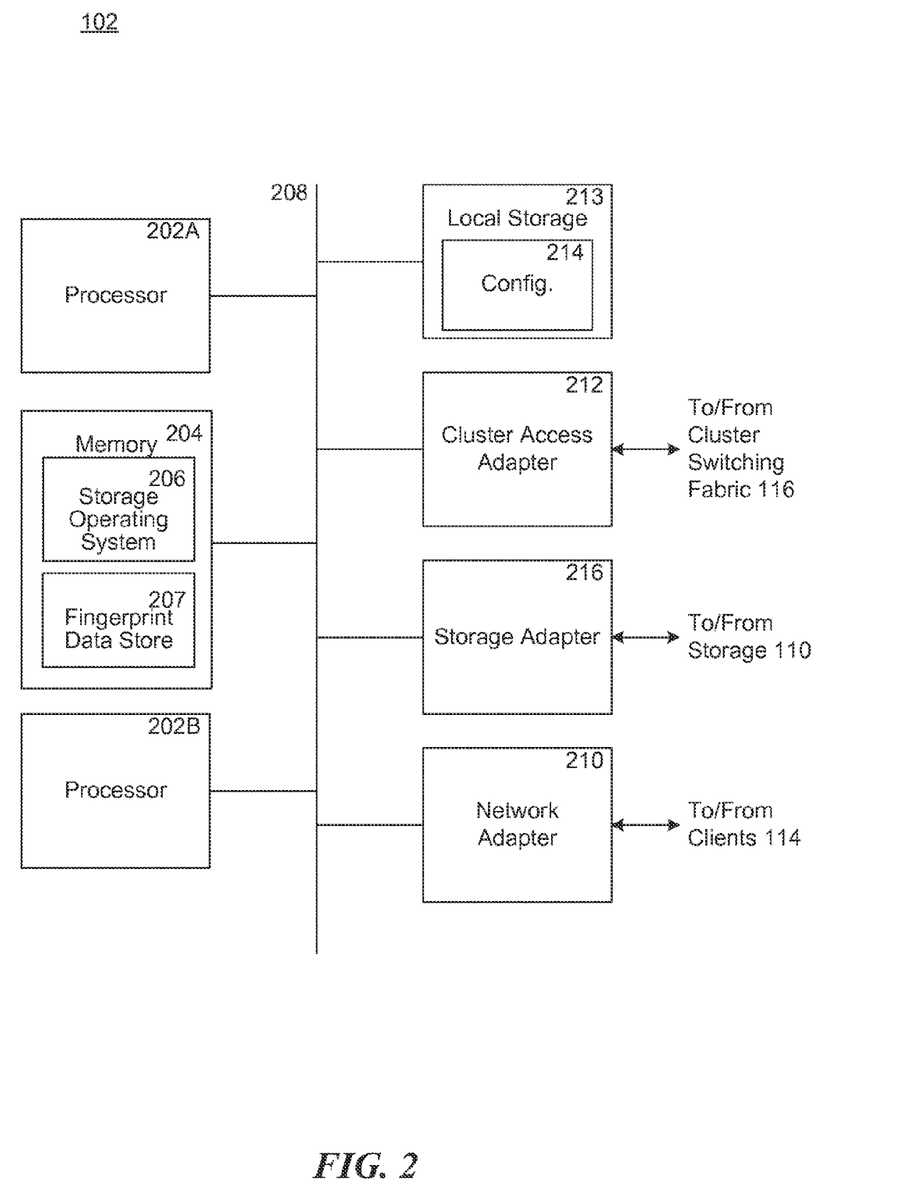
FIG. 2 is a high-level block diagram showing an example of the architecture of a node, which can represent any of the storage cluster nodes.

FIG. 2 is a block diagram of one embodiment of a node 102, that includes multiple processors 202A and 202B, a memory 204, a network adapter 210, a cluster access adapter 212, a storage adapter 216 and local storage 213 interconnected by an interconnect system (also referred to as bus) 208. The local storage 213 comprises one or more physical storage devices, such as disks, non-volatile storage devices, flash drives, video tape, optical, DVD, magnetic tape, electronic random access memory, micro-electro mechanical and any other similar media adapted to store information. The local storage 213 can also be utilized by the node to locally store configuration information (e.g., in a configuration data structure 214).

Processors 202A/202B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices. In other embodiments, a node can include a single processor, instead of multiple processors. The bus system 208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The cluster access adapter 212 can comprise one or more ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments, where the N-modules and D-modules are implemented on separate storage systems or computers, the cluster access adapter 212 is utilized by the N-module or D-module for communicating with other N-module and/or D-modules in the cluster 100.

The network adapter 210 can further comprise one or more ports adapted to couple the node 102 to one or more clients 114 over point-to-point links, wide area networks, virtual private networks implemented over a public network (e.g., Internet) or a shared local area network. The network adapter 210 thus can comprise the mechanical, electrical and signaling circuitry needed to connect the node to the network.

The storage adapter 216 cooperates with a storage operating system 206 executing on the node 102 to access data requested by the clients. The data can be stored on any type of attached storage device media such as video tape, optical, DVD, magnetic tape, bubble memory, electronic random access memory, micro-electro mechanical and any other similar media adapted to store information, including data and parity information. For example, as illustrated in FIG. 1, the data can be stored in the storage devices 108 of array 110, which may be a redundant array of inexpensive devices (RAID) array, for example. The storage adapter 216 can include a plurality of ports having input/output (I/O) interface circuitry that couples to the storage devices over an I/O interconnect arrangement, such as a conventional high-performance, Fibre Channel (FC) link topology.

Although various adapters (210, 212 and 216) have been shown as separate hardware based components, the embodiments disclosed herein are not limited to those elements being separate components. For example, the embodiments disclosed herein may be implemented using a converged network adapter (CNA) that is capable of handling both network and storage protocols, for example, a Fibre Channel over Ethernet (FCoE) adapter.

Each node 102 is illustratively embodied as a multiple-processor system executing the storage operating system 206. The operating system 206 can run on the processors as a high-level data organization module, that includes a file system to logically organize the data as a hierarchical structure of volumes, directories, files (possibly including special types of files called virtual disks), and data blocks (hereinafter generally "blocks") on storage devices 108. However, it will be apparent to those of ordinary skill in the art that the node 102 can alternatively comprise a single processor or more than two processors. In one embodiment, one processor 202A executes the functions of the N-module 104 on the node, while the other processor 202B executes the functions of the D-module 106.

The memory 204 can record storage locations that are addressable by the processors and adapters for storing programmable instructions and data structures. The processor and adapters can, in turn, include processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein. The memory 204 can store a fingerprint data store 207, which is discussed in details in the following paragraphs. The fingerprint data store 207 can be, for example, a fingerprint database.

The operating system 206 can be, for example, a version or modification of the DATA ONTAP® operating system available from NetApp®, Inc., which may implement the Write Anywhere File Layout (WAFL®) file system. However, any appropriate storage operating system can be enhanced for use in accordance with the inventive principles described herein.

Storage of data on each storage array 110 is preferably implemented as one or more storage "volumes" that comprise a collection of physical storage devices 108 cooperating to define an overall logical arrangement of volume block number (VBN) space on the volume(s). Each logical volume is generally, although not necessarily, associated with its own file system. The storage devices 108 within a logical volume/file system are typically organized as one or more groups, wherein each group may be operated as a RAID group. Each logical volume can include multiple data containers. The term "data container" as used throughout this specification means a logical container of dats, such as a file, a logical unit identified by a logicial unit number (LUN), a data block or any other unit for organizing data.

The storage operating system 206, at least a portion of which is typically resident in the memory of the node 102 invokes operations in support of the storage service implemented by the node 102. For instance, the operations can include data deduplication process or deduplication potential estimation process, as discussed in details in the following paragraphs.

Figure 3:
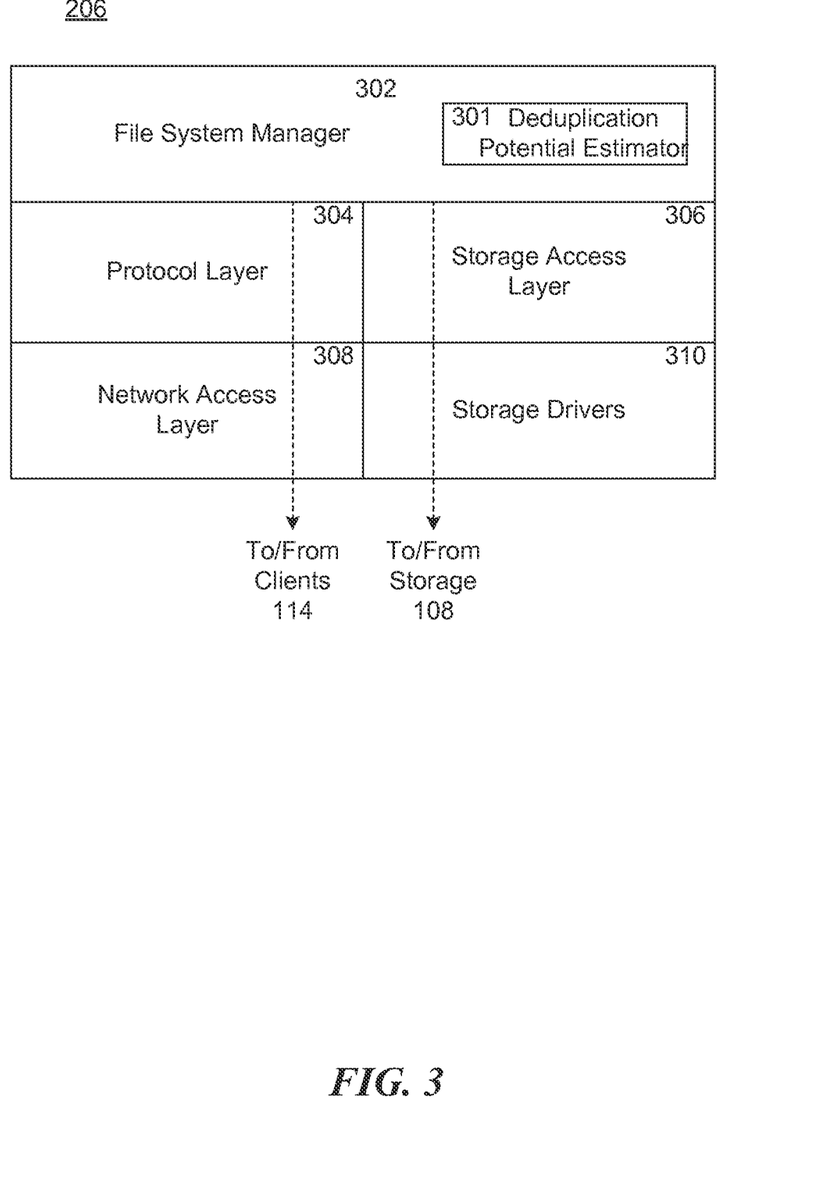
FIG. 3 illustrates an example of an operating system executed by a node in a storage cluster.

FIG. 3 illustrates an example of operating system 206 executed by node 102, according to one embodiment of the present disclosure. In one example, operating system 206 can include several modules, or "layers" executed by one or both of N-Module 104 and D-Module 106. These layers include a file system manager 302 that keeps track of a directory structure (hierarchy) of the data stored in storage devices and manages read/write operations. The operations include read and write operations on storage devices in response to requests from the client 114. File system 302 can also include a deduplication potential estimator module 301 that can conduct a fast estimation of the storage savings of the data set by scanning a certain portion of the data set.

Operating system 206 can also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others, as described below.

Network access layer 308 can include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 can also include a storage access layer 306 and an associated storage driver layer 310 to allow D-module 106 to communicate with one or more storage devices. The storage access layer 306 may implement a higher-level disk storage protocol, such as RAID, while the storage driver layer 310 may implement a lower-level storage device access protocol, such as FC or SCSI. In one embodiment, the storage access layer 306 may implement the RAID protocol, such as RAID-4 or RAID-DP™ (RAID double parity for data protection provided by NetApp Inc.).

In one embodiment, the deduplication potential estimation process includes a process to scan a sampling portion of a data set. Optionally, in operation, the storage system maintains a fingerprint data store, like the fingerprint data store 207 illustrate in FIG. 2, in a memory, a disk array, or other type of storage device of the storage system. The fingerprint data store maintains information about fingerprints (e.g., hashes) of data stored in data blocks of the data set. The sizes of the fingerprints are much smaller than the sizes of the data blocks. Thus, the fingerprints are easier to manage and keep track of than the data blocks. The fingerprints uniquely identify the data stored in the data blocks, and therefore are used for data deduplication purposes. The fingerprint data store further records numbers of duplicates (also referred to as duplicate counter number or frequency) for all unique fingerprints. In other words, the fingerprint data store tracks the number of blocks which have a particular block fingerprint in the data set. By managing the fingerprint data store in accordance with the techniques introduced here, the storage system can conduct a fast and accurate estimation on the potential storage savings from a data deduplication.

Although the embodiments in the description use data blocks as examples of data sequences on which a data deduplication process can perform, the techniques described herein can be readily applied to other types of data sequences, as contemplated by a person having ordinary skill in the art.

Figure 4A:
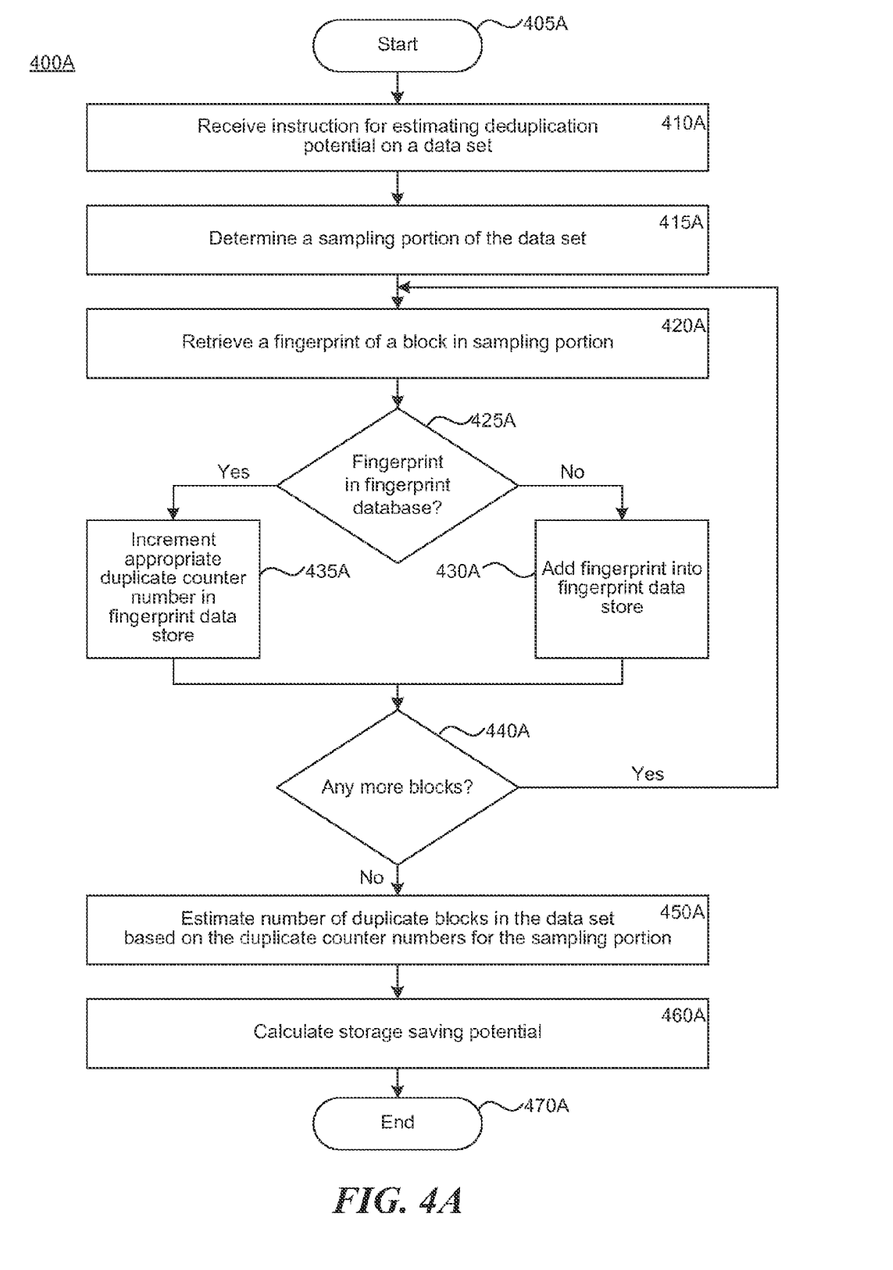
FIG. 4A illustrates an example of a process of estimating deduplication potential.

FIG. 4A illustrates an example of a process 400A of estimating deduplication potential. The process 400A begins in step 405A and continues to step 410A where the storage system receives a request to estimate deduplication potential on a data set. The storage system can be a storage cluster as the storage cluster 100 in FIG. 1, or a standalone storage server. The request can be received from a client or a process within the storage system. The request can include a reference to the data set. In response to the request, the storage system determines a sampling portion of the data set at step 415A. In one embodiment, the storage system determines the sampling portion by randomly choosing blocks in the data set. In one embodiment, the sampling portion is selected to be independent on the organization of the data in the data set. For instance, the sampling portion can be selected based on a random sampling algorithm disclosed in U.S. Pat. No. 7,437, 492. The size of the sampling portion can be a parameter (as a percentage number) supplied in the request, a predetermined percentage value, or a percentage value calculated by examining the data pattern of a small portion of the data set.

At step 420A, the deduplication potential estimator of the storage system retrieves a fingerprint of a block in the sampling portion of the data set. The fingerprint can be generated on-the-fly when the storage system attempts to retrieve it, or the fingerprint can be generated and stored before the fingerprint retrieving process. For each retrieved block fingerprint, the deduplication potential estimator compares the block fingerprints with entries in the fingerprint data store to check whether the block fingerprint is in the fingerprint data store (425A). The fingerprint data store records block fingerprints as well as numbers of duplicates (also referred to as duplicate counter number or frequency). Each unique fingerprint has a corresponding duplicate counter number stored in the fingerprint data store. A duplicate counter number of a unique fingerprint is the number of blocks in the sampling portion which have that unique fingerprint. For example, if there are four blocks in the sampling portion that have the same fingerprint, that unique fingerprint has a duplicate counter number of four.

If the block fingerprint is not in the fingerprint data store, at step 430A the deduplication potential estimator adds the block fingerprint into the fingerprint data store and sets a duplicate counter number of that fingerprint to a value of one (1). If the block fingerprint is in the fingerprint data store, at step 435A the deduplication potential estimator increments the duplicate counter number of that fingerprint by one in the fingerprint data store.

At step 440A, deduplication potential estimator determines whether there are more blocks to be retrieved from the sampling portion. If there are more blocks to be retrieved in the sampling portion, the storage system goes back to step 420A to retrieve additional fingerprints of blocks in the sampling portion. Otherwise, the process continues to step 450A to estimate the number of duplicate blocks in the data set based on the duplicate counter numbers of the sampling portion. Then at step 460A the storage system calculates the potential storage savings that can benefits from a data deduplication, based on the number of duplicate blocks in the data set. The potential storage savings are the potential saving of a storage space occupied by the data set from a data deduplication. The details of the step 450A and 460A are disclosed in the following paragraphs. The process ends at step 470A.

Figure 4B:
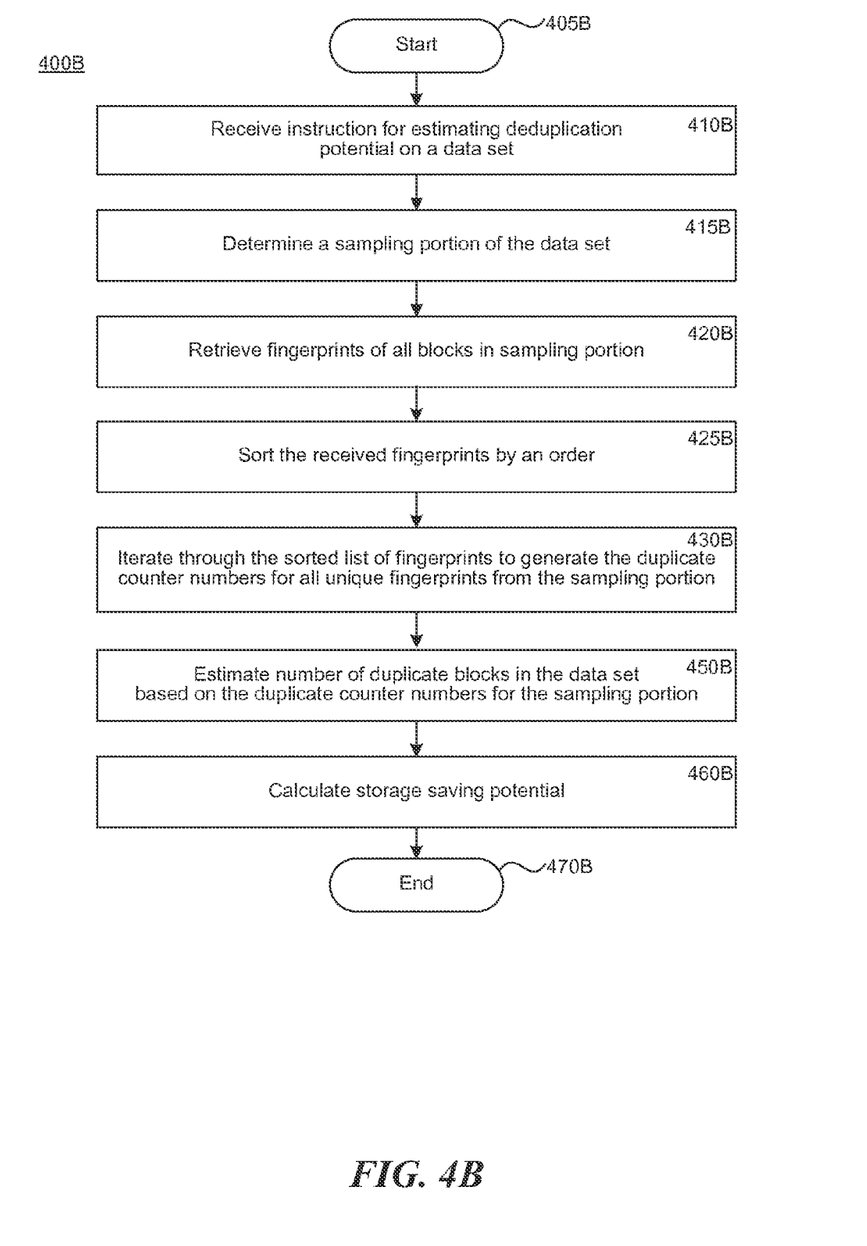
FIG. 4B illustrates another example of a process of estimating deduplication potential.

In one embodiment, instead of comparing the fingerprints from the sampling portion to a fingerprint data store, duplicate fingerprints can be counted by sorting the fingerprints and iterating through the sorted fingerprints. FIG. 4B illustrates another example of a process 400B of estimating deduplication potential. Similarly to the process 400A, the process 400B begins in step 405B and continues to step 410B where the storage system receives a request to estimate deduplication potential on a data set. In response to the request, the storage system determines a sampling portion of the data set at step 415B.

At step 420B, the deduplication potential estimator of the storage system retrieves fingerprints of all blocks in the sampling portion of the data set. After receiving the fingerprints, at step 425B, the deduplication potential estimator sorts the received fingerprints by an order. For example, the deduplication potential estimator can sort the received fingerprints by an order of the numerical values of the fingerprints.

After the sorting, duplicate fingerprints are grouped together in the sorted list of fingerprints. At step 430B, the deduplication potential estimator iterates through the sorted list of fingerprints to generate the duplicate counter numbers for all unique fingerprints from the sampling portion.

The process 400B continues to step 450B to estimate the number of duplicate blocks in the data set based on the duplicate counter numbers of the sampling portion. Then at step 460B the storage system calculates the potential storage savings that can benefits from a data deduplication, based on the number of duplicate blocks in the data set. The potential storage savings are the potential saving of a storage space occupied by the data set from a data deduplication. The process ends at step 470A. In one embodiment, the process continues to decide whether to perform a deduplication process on the storage device that the data set occupies based on the potential storage savings. The storage device performs the deduplication process on the storage device based on the decision.

After the deduplication potential estimator performs the process exemplified by steps 420A-440A and 420B-430B, the fingerprint data store includes all the unique fingerprints and the corresponding duplicate counter numbers. For an individual duplicate counter number, the number of unique fingerprints which have that individual duplicate counter number is called the "set number." For example, assuming there are 20 unique fingerprints having a duplicate counter number of 1 (i.e. only one data block has one of the 20 unique fingerprints), the set number for counter 1 is 20. Assuming there are 11 unique fingerprints having a duplicate counter number of 2 (i.e. only two blocks have one of the 11 unique fingerprints), the set number for counter 2 is 11. Similarly, assuming there are 5 unique fingerprints having a duplicate counter number of 3 (i.e. only three blocks have one of the 5 unique fingerprints), the set number for counter 3 is 5.

In one embodiment, when estimating deduplication potential of a data set based on the duplication information of a sampling portion of the data set, different approaches can be taken for larger and smaller counter numbers (also referred to as higher and lower frequencies). For unique fingerprints having larger counter numbers in the sampling portion, typically these counter numbers can be directly extrapolated to represent unique fingerprints in the data set. For instance, assuming there are 14 sets of unique fingerprints having a counter of 40 in the data set, if the sampling percentage is 5% of the data set, the sampling portion would be expected to have 14 sets of these unique fingerprints with a counter number of about 2 (i.e. 40*5%). In other words, for fingerprints having higher frequencies, S sets of unique fingerprints having a counter of C in sampling portion will be extrapolated as S sets of unique fingerprints having a counter of C/p, wherein p is the sampling percentage.

For smaller counter numbers (or lower frequencies), the counter numbers are not expected to be scaled directly with the sampling percentage. Typically these unique fingerprints having smaller counter numbers in the sampling portion are used to predict collisions in the data set. The term "collision" refers to a situation of more than one block having the same fingerprint. Two blocks "collide" when they have the same fingerprint. In one embodiment, the number of duplicates of the fingerprints of the data set can be estimated by a probability of fingerprints from the data set colliding in the sampling portion. For instance, the number of duplicate blocks (i.e. blocks having duplicate fingerprints) can be determined according to the following collision estimation equation:

$$c = n + d - d*((d-1)/d)^n$$

wherein d is the total number of unique fingerprints of the data set, n is a size of the sampling portion in terms of number of blocks, and c is the number of the duplicates of fingerprints of the sampling portion.

The set numbers for different counter numbers can be used to calculate c, the number of duplicates of fingerprints of the sampling portion. The size of the sampling portion, n, can be calculated by sampling percentage and the size of the data set. Accordingly, the total number of unique fingerprints of the data set, d, can be solved using the collision estimation equation. The number of duplicate blocks in the data set is the size of the data set (in terms of number of blocks) minus the total number of unique fingerprints of the data set (d). The potential storage savings for the data set is the number of duplicate blocks in the data set divided by the size of the data set In one embodiment, when using the collision estimation equation, the size of the data set is adjusted by subtracting the number of duplicates for the higher frequency sets. In some embodiments, the cutoff value between larger counter numbers and smaller counter numbers is determined empirically based on the test runs on existing data sets. In some other embodiments, the cutoff value is predetermined to be two or three.

In some embodiments, all fingerprints in the sampling portion are treated as higher frequency sets. (In other words, the cutoff value is zero.) That means that all sets of different counter numbers in the sampling portion are directly extrapolated to predict duplication information in the data set. In some other embodiments, all fingerprints in the sampling portion are treated as lower frequency sets. (In other words, the cutoff value is infinitely large.) That means that all sets of different counter numbers in the sampling portion are used to predict duplication information in the data set by the collision estimation formula.

Figure 5:
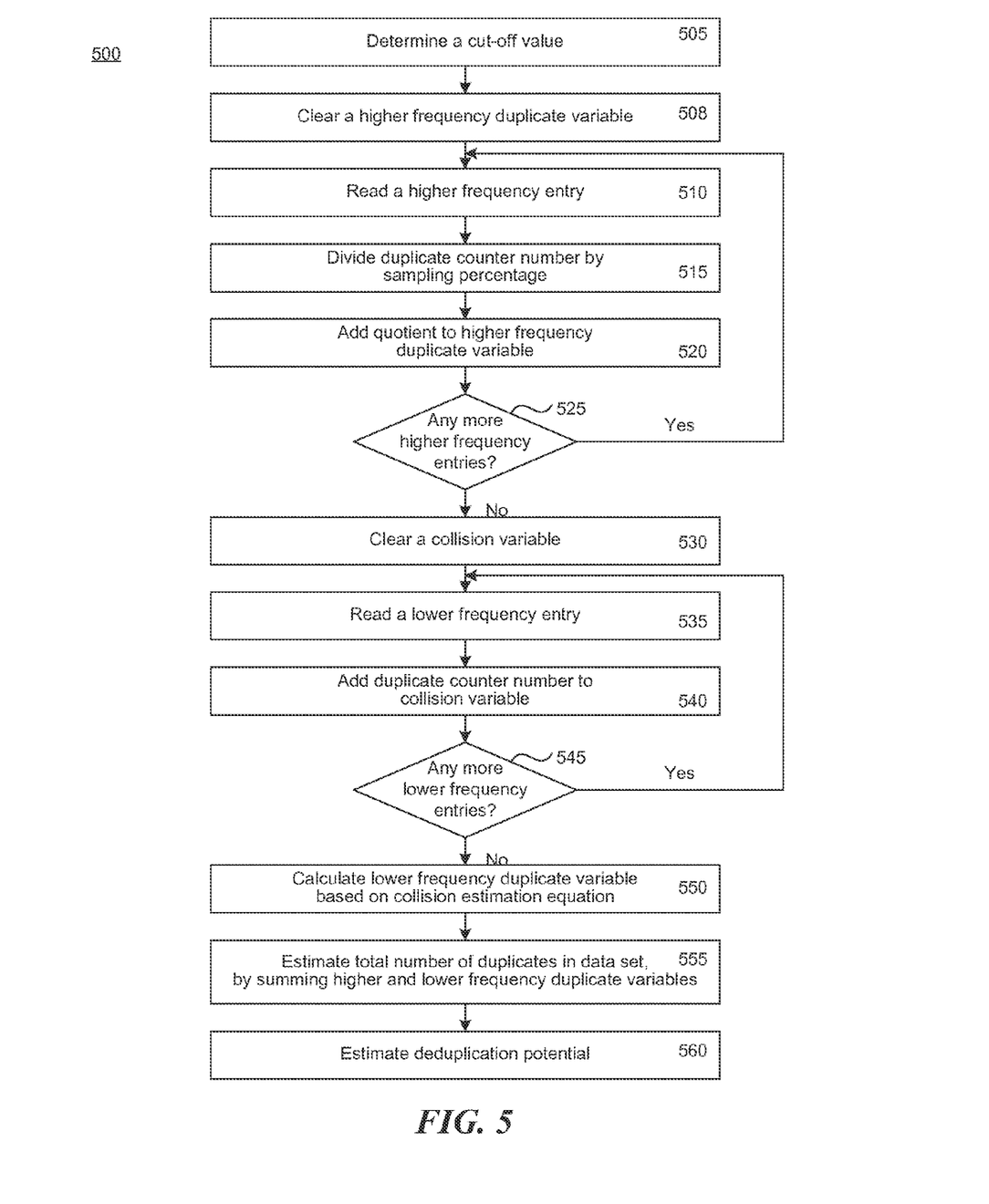
FIG. 5 illustrates an example of a process of estimating the number of duplicate blocks in a data set based on duplication information of a sampling portion for the data set.

FIG. 5 illustrates an example of a process 500 of estimating the number of duplicate blocks in a data set based on duplication information of a sampling portion of the data set, by a deduplication potential estimator of a storage system. Before the process 500 starts, the storage system has scanned fingerprints of all blocks in the sampling portion and stored the duplication information of the sampling portion in the fingerprint data store.

In one embodiment, at step 505 the deduplication potential estimator determines a cut-off value for separating the entries in the fingerprint data store into a higher frequency section and a lower frequency section. The higher frequency section includes fingerprints having duplicate counter numbers larger than the cut-off value. The lower frequency section includes fingerprints having duplicate counter numbers less than or equal to the cut-off value.

In another embodiment, the deduplication potential estimator receives the cut-off value as a parameter of a request for estimating deduplication potential. In yet another embodiment, the deduplication potential estimator can determine more than one cut-off value. For instance, the deduplication potential estimator determines two cut-off values in order to divide the entries of the fingerprint data store into three sections. Each of the three sections is treated with a different approach for estimating deduplication potential in the data set.

Once the cut-off value is determined, the deduplication potential estimator estimates the higher frequency duplicates of fingerprints in the data set by direct scaling approach disclosed in the above paragraphs. The deduplication potential estimator clears a higher frequency duplicate variable to zero at step 508. At step 510, the deduplication potential estimator reads a higher frequency entry (i.e., a unique fingerprint entry having a duplicate counter number larger than the cut-off value) from the fingerprint data store. The deduplication potential estimator divides the duplicate counter number f by the sampling percentage p at step 515:

$$q = f/p.$$

Then at step 520, the deduplication potential estimator adds the quotient value from the division q into the higher frequency duplicate variable $d_h$:

$$d_h = d_h + q.$$

The deduplication potential estimator then checks whether there are more higher frequency entries from the fingerprint data store that have not been read (525). If there is another higher frequency entry, the process goes back to step 510 to read the next higher frequency entry. Otherwise, the process proceeds to step 530.

The deduplication potential estimator further estimates the lower frequency duplicates of fingerprints in the data set using collision estimation equation. The deduplication potential estimator clears a collision variable c to zero (0) at step 530:

$$c = 0.$$

At step 535, the deduplication potential estimator reads a lower frequency entry (i.e., a unique fingerprint entry having a duplicate counter number less than or equal to the cut-off value) from the fingerprint data store. At step 540, the deduplication potential estimator adds the duplicate counter number f minus one into the collision variable c:

$$c = c + (f-1).$$

The deduplication potential estimator then checks whether there are more lower frequency entries from the fingerprint data store that have not been read since step 530 (545). If there is another lower frequency entry, the process goes back to step 535 to read the next lower frequency entry. Otherwise, the process proceeds to step 550. At step 550, the deduplication potential estimator calculates a lower frequency duplicate variable based on the collision estimation equation:

$$c = n + d_l - d_l * ((d_l - 1)/d_l)^n;$$

wherein $d_l$ is the lower frequency duplicate variable, n is a size of the sampling portion in terms of number of blocks, and c is the collision variable.

Then at step 555, the deduplication potential estimator estimates a total number of duplicates of fingerprints in the data set, based on the higher frequency duplicate variable $d_h$ and the lower frequency duplicate variable $d_l$. In one embodiment, the total number of duplicates in the data set is calculated as the sum of the higher frequency duplicate variable and the lower frequency duplicate variable. In another embodiment, the total number of duplicates in the data set is calculated as a function of the higher frequency duplicate variable and the lower frequency duplicate variable. The function is empirically determined by test runs on existing test data sets.

The deduplication potential estimator can estimate the deduplication potential by dividing the total number of duplicates in the data set by the size of the data set (in terms of blocks) at step 560. This deduplication potential suggests the percentage of storage space occupied by the data set which can be saved by running a data deduplication on the data set.

Figure 6:
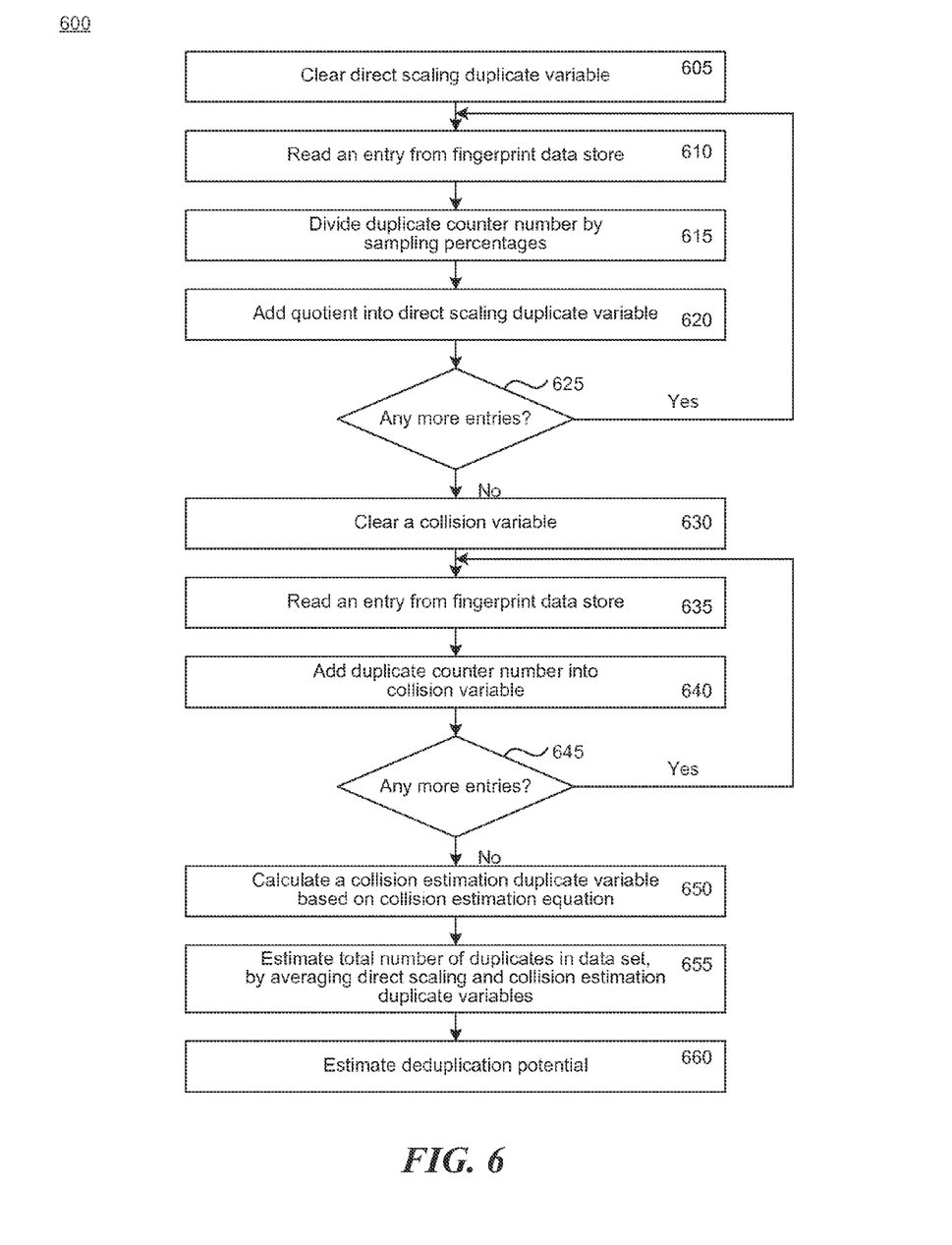
FIG. 6 illustrates another example of a process of estimating number of duplicate blocks in a data set based on duplication information of a sampling portion of the data set.

In another embodiment, instead of separating the entries in the fingerprint data store entries into sections, the deduplication potential estimator can estimate the deduplication potential with multiple different approaches each on the entire entries of the fingerprint data store. The deduplication potentials from different approaches then can be averaged or algorithmically combined in some other way for a better estimation. FIG. 6 illustrates another example of a process 600 of estimating number of duplicate blocks in a data set based on duplication information of a sampling portion of the data set. Similarly as in FIG. 5, before the process 600 starts, the storage system has scanned fingerprints of all blocks in the sampling portion and stored the duplication information of the sampling portion in the fingerprint data store.

At step 605, the deduplication potential estimator of the storage system clears a direct scaling duplicate variable to zero. At step 610, the deduplication potential estimator reads an entry of a unique fingerprint having a duplicate counter number from the fingerprint data store. The deduplication potential estimator divides the duplicate counter number f by the sampling percentage p at step 615:

$$q=f/p.$$

Then at step 620, the deduplication potential estimator adds the quotient value from the division q into the direct scaling duplicate variable d:

$$d=d+q.$$

The deduplication potential estimator then checks whether there are more entries from the fingerprint data store that have not been read (625). If there is another entry, the process goes back to step 610 to read the next entry. Otherwise, the process proceeds to step 630.

The deduplication potential estimator further estimates the number of duplicates of fingerprints in the data set using collision estimation equation. The deduplication potential estimator clears a collision variable c to zero at step 630

$$c=0.$$

At step 635, the deduplication potential estimator reads an entry of a unique fingerprint having a duplicate counter number f from the fingerprint data store. At step 640, the deduplication potential estimator adds the duplicate counter number c minus one into the collision variable:

$$c=c+(c-1).$$

The deduplication potential estimator then checks whether there are more entries from the fingerprint data store that have not been read since step 630 (645). If there is another entry, the process goes back to step 635 to read the next entry. Otherwise, the process proceeds to step 650. At step 650, the deduplication potential estimator calculates a collision estimation duplicate variable based on the collision estimation equation:

$$c=n+d-d^{*}((d-1)/d)^{n};$$

wherein d is the collision estimation duplicate variable, n is a size of the sampling portion in terms of number of blocks, and c is the collision variable.

Then at step 655, the deduplication potential estimator estimates a total number of duplicates of fingerprints in the data set, based on the direct scaling duplicate variable and the collision estimation duplicate variable. In one embodiment, the total number of duplicates in the data set is calculated as an average of the direct scaling duplicate variable and the collision estimation duplicate variable. In another embodiment, the total number of duplicates in the data set is calculated as a function of the higher frequency duplicate variable and the lower frequency duplicate variable. The function can be a weighted averaging function empirically determined by test runs on existing test data sets.

Similar to process 500, the deduplication potential estimator can estimate the deduplication potential by dividing the total number of duplicates in the data set by the size of the data set (in terms of blocks) at step 660. This deduplication potential suggests the percentage of storage space occupied by the data set which can be saved by running a data deduplication on the data set.

The process 500 and the process 600 can be combined. For instance, the deduplication potential estimator of the storage system can run two different estimation approaches like in the process 600. But in the second approach, instead of just using collision estimation, the deduplication potential estimator can use a cut-off value to divide and treat higher and lower frequency sections differently and to apply direct scaling and collision estimation approaches, as disclosed in process 500.

In some embodiments, approaches other than direct scaling or collision estimation can be used as a replacement of an approach, or as an additional approach. For instance, the process 600 disclosed above can further include a third approach. The total number of duplicates in the data set is calculated as an average of the estimate variables from direct scaling approach, collision estimation approach, and the third approach. In one embodiment, for example, the third approach is a clamped collision estimation approach. In the clamp collision estimation approach, a clamp value is empirically determined. For example, the clamp value can be decided by running the clamped collision estimation approaches on a sampling portion of a test data set with different clamp values and choosing the optimal clamp value with the deduplication potential result closest to the actual duplication value of the test data set. For instance, if the clamp value is two, any entries having duplicate counter number over two in the fingerprint data store will be treated as if the corresponding duplicate counter number is two. In other words, when calculating the collision variable as in process 600, any unique fingerprint entry having more than two duplicates will be treated as if the entry only has two duplicates in the sampling portion.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method of estimating deduplication potential, comprising:
    identifying duplicates of fingerprints of a sampling portion of a data set occupying at least a portion of a storage space;
    for each unique fingerprint for the sampling portion, recording a duplicate counter number in a fingerprint data store, wherein the duplicate counter number indicates a number of data blocks in the sampling portion all of which have that unique fingerprint;
    for each duplicate counter number in the fingerprint data store, changing that duplicate counter number to a common clamp value if that duplicate counter number is larger than the common clamp value;
    determining a sampling count of the identified duplicates of fingerprints in the sampling portion, by summing the duplicate counter numbers in the fingerprint data store;
    determining, by a processor, a data set count of duplicates of fingerprints in the data set depending on the sampling count of the identified duplicates of fingerprints in the sampling portion, based on a probability of fingerprints from the data set colliding in the sampling portion; and
    estimating, by the processor, a potential saving of the storage space occupied by the data set from a data deduplication, based on the determined data set count of duplicates of fingerprints in the data set.

2. The method of claim 1, wherein the data set count of duplicates of the fingerprints in the data set is a function of the sampling count of the identified duplicates of fingerprints in the sampling portion and a size of the sampling portion.

3. The method of claim 1, wherein the data set count of duplicates of the fingerprints in the data set depends on the sampling count of duplicates of fingerprints in the sampling portion, a size of the sampling portion and a size of the data set.

4. The method of claim 1, wherein the data set count of duplicates of the fingerprints in the data set is estimated according to the equations:

$$c = n + d - d^*((d-1)/d)^n, \text{ and } t = s - d;$$

wherein d is a number of unique fingerprints in the data set, n is a size of the sampling portion, c is the sampling count of duplicates of fingerprints in the sampling portion, s is a size of the data set, t is the data set count of duplicates of the fingerprints in the data set.

5. The method of claim 1, wherein the fingerprints of the data set are fingerprints of data blocks of the data set.

6. The method of claim 1, further comprising:
    separating entries in the fingerprint data store into a higher frequency section and a lower frequency section based on a cut-off value, wherein the duplicate counter numbers in the higher frequency section are larger than the cut-off value, and the duplicate counter numbers in the lower frequency section are smaller than or equal to the cut-off value.

7. The method of claim 6, wherein the step of determining comprises:
    determining, by the processor, a data set count of duplicates of fingerprints in the data set depending on a lower frequency count of the identified duplicates of fingerprints in the lower frequency section based on a probability of fingerprints from the data set colliding in the sampling portion.

8. The method of claim 7, further comprising:
    estimating, by the processor, a second data set count of duplicates of fingerprints in the data set depending on a higher frequency count of the identified duplicates of fingerprints in the higher frequency section, by dividing the higher frequency count of the identified duplicates of fingerprints in the higher frequency section by a sampling percentage, wherein the sampling percentage indicates a ratio between a size of the sampling portion and a size of the data set.

9. The method of claim 8, further comprising:
    determining, by the processor, a total count of duplicates of fingerprints of the data set by summing the data set count of duplicates of fingerprints in the data set and the second data set count of duplicates of fingerprints in the data set.

10. The method of claim 1, further comprising:
    estimating, by the processor, a second data set count of duplicates of fingerprints in the data set depending on the sampling count of the identified duplicates of fingerprints of the sampling portion, by dividing the sampling count of the identified duplicates of fingerprints of the sampling portion by a sampling percentage, wherein the sampling percentage indicates a ratio between a size of the sampling portion and a size of the data set.

11. The method of claim 10, further comprising:
    determining, by the processor, a total count of duplicates of fingerprints of the data set by averaging the data set count of duplicates of fingerprints in the data set and the second data set count of duplicates of fingerprints in the data set.

12. The method of claim 1, wherein the sampling portion is randomly selected from the data set; and the method further comprising:
    deduplicating the data set occupying the storage space based on the potential saving of the storage space.

13. A system, comprising:
    a processor; and a memory storing instructions which, when executed by the processor, cause the system to perform a process of estimating deduplication potential including:

selecting randomly a plurality of data blocks from a data set as a sampling portion of the data set;

collecting fingerprints of the plurality of data blocks of the sampling portion;

identifying duplicates of fingerprints of the data blocks of the sampling portion from the fingerprints of the plurality of data blocks;

estimating a number of unique fingerprints in the data set depending on a number of the duplicates of fingerprints in the sampling portion, based on a probability of fingerprints from the data set colliding in the sampling portion; and determining a number of duplicates of fingerprints of the data set depending on the number of the unique fingerprints of the data set;

wherein the number of unique fingerprints of the data set is determined according to the equation:

$$c = n + d - d*((d-1)/d)^n;$$

wherein d is the number of unique fingerprints of the data set, n is a size of the sampling portion, and c is the number of the duplicates of fingerprints of the sampling portion.

14. The system of claim 13, wherein the estimating comprises:

estimating a number of unique fingerprints of the data set depending on the number of the duplicates of fingerprints of the sampling portion and the size of the sampling portion based on the probability of fingerprints from the data set colliding in the sampling portion.

15. A storage system, comprising:

a processor;

a memory storing instructions which, when executed by the processor, cause the storage system to perform a process including:

identifying duplicates of fingerprints for a sampling portion of a data set stored in a data storage device; and estimating, by the processor, a data set count of duplicates of fingerprints in the data set depending on a sampling count of the identified duplicates of fingerprints in the sampling portion, based on a probability of fingerprints from the data set colliding in the sampling portion; and a fingerprint data store, wherein the fingerprint data store records unique fingerprints of the sampling portion and duplicate counter numbers, each duplicate counter number corresponds to a fingerprint of the unique fingerprints and indicates a number of data blocks in the sampling portion which have that fingerprint;

wherein for each unique fingerprint in the fingerprint data store which has a duplicate counter number larger than a cut-off value, a number of duplicates of that unique fingerprint in the data set is estimated by dividing the duplicate counter number by a sampling percentage, wherein the sampling percentage indicates a ratio between a size of the sampling portion and a size of the data set.

16. The storage system of claim 15, wherein the process further includes:

determining, by the processor, a potential saving of a storage space occupied by the data set from a data deduplication, based on the estimated data set count of duplicates of fingerprints in the data set.

17. The storage system of claim 16, wherein the processor is further configured to conduct a data deduplication on the data set stored in the data storage device, if the potential saving exceeds a predetermined value.

18. The storage system of claim 15, wherein the data set count of duplicates of the fingerprints in the data set is determined by a collision probability function depending on the sampling count of the identified duplicates of fingerprints in the sampling portion and a size of the sampling portion.

19. The storage system of claim 15, wherein the processor and the data storage device are respectively in two separated nodes within the storage system.

20. The storage system of claim 15, wherein two fingerprints from the data set collides in the sampling portion when the two fingerprints have the same fingerprint value.

* * * * *